Patented Dec. 5, 1944

2,364,402

UNITED STATES PATENT OFFICE 2,364,402

SOLDER FOR ALUMINUM WORKPIECES

Fred Strasser, Basel, Switzerland, assignor to Alexandre Clavel, Basel, Switzerland No Drawing. Application June 17, 1942, Serial No. 447,449. In Switzerland October 2, 1941

2 Claims. (Cl. 75—134)

The present invention relates to solder for aluminum work pieces.

Aluminum solders in use have proved to be subjected to corrosion. Contrasting therewith the invention provides an aluminum solder which includes the advantage to be absolutely non-corrodible. Consequently this solder is specially suitable for the soldering of cables, particularly submarine cables.

According to the invention the solder consists of tin, cadmium and silver, preferably in proportions of 30 to 45% tin, 35 to 50% cadmium and 10 to 20% silver. By way of example, the solder may have the following constitution: 42% tin, 42% cadmium and 16% silver.

The production process of the solder can, for instance, be the following: At first the silver is melted, then cadmium and afterwards tin are added in the above mentioned proportions.

The melting is suitably performed in crucibles, for instance graphite crucibles, and the molten alloy is afterwards poured into moulds. These moulds can consist of any metal, as the cooling in such moulds is of no detrimental influence upon the solder obtained.

For soldering work pieces, the surfaces to be soldered must be cleaned, then heated and after the solder being applied thereon, they must be pressed together.

When soldering with aluminum solder according to the invention it is quite superfluous to use fluxes, welding means or covering means, for instance stearin, soap, colophony etc., means as they are in use with hitherto known aluminum solders.

What I claim is:

1. Solder for aluminum work pieces consisting of 30 to 45% tin, 35 to 50% cadmium and 10 to 20% silver.

2. Solder for aluminum work pieces consisting of 42% tin, 42% cadmium and 16% silver.

FRED STRASSER.